United States Patent

Jones et al.

[11] Patent Number: 6,141,189
[45] Date of Patent: *Oct. 31, 2000

[54] LAMINATED STEEL RETURN PATH WITH ACTUATOR SUPPORT FEATURES

[75] Inventors: David E. Jones; John C. Briggs, both of Layton, Utah

[73] Assignee: Iomega Corporation, Roy, Utah

[*] Notice: This patent is subject to a terminal disclaimer.

[21] Appl. No.: 09/302,038

[22] Filed: Apr. 29, 1999

Related U.S. Application Data

[63] Continuation of application No. 08/881,805, May 30, 1997, Pat. No. 5,943,194, which is a continuation-in-part of application No. 08/749,999, Nov. 15, 1996, Pat. No. 5,748,410.

[51] Int. Cl.$^7$ ..................................................... G11B 5/55
[52] U.S. Cl. ............................................................. 360/264.8
[58] Field of Search .............................................. 360/106

[56] References Cited

U.S. PATENT DOCUMENTS

| | | | |
|---|---|---|---|
| 4,504,879 | 3/1985 | Toldi et al. | 360/105 |
| 4,573,094 | 2/1986 | Gibeau et al. | 360/106 |
| 4,619,028 | 10/1986 | Neuenschwander | 29/33 L |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,812,934 | 3/1989 | Suzuki et al. | 360/104 |
| 4,819,108 | 4/1989 | Seki et al. | 360/104 |
| 4,823,217 | 4/1989 | Kato et al. | 360/104 |
| 4,835,642 | 5/1989 | Furukawa et al. | 360/104 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,087,849 | 2/1992 | Neuenschwander | 310/216 |
| 5,123,155 | 6/1992 | Neuenschwander | 29/596 |
| 5,166,846 | 11/1992 | Shigemoto | 360/104 |
| 5,291,359 | 3/1994 | Wolter | 360/104 |
| 5,305,167 | 4/1994 | Nagase et al. | 360/104 |
| 5,504,636 | 4/1996 | Yuki et al. | 360/106 |
| 5,508,864 | 4/1996 | Briggs et al. | 360/106 |
| 5,530,607 | 6/1996 | Spendlove | 360/105 |
| 5,585,679 | 12/1996 | Bracken et al. | 310/13 |
| 5,731,933 | 3/1998 | Sonderegger et al. | 360/106 |
| 5,748,410 | 5/1998 | Briggs et al. | 360/106 |
| 5,943,194 | 8/1999 | Jones et al. | 360/106 |

FOREIGN PATENT DOCUMENTS

| | | |
|---|---|---|
| 0 326 374 A2 | 8/1989 | European Pat. Off. . |
| 8-235596 | 9/1996 | Japan . |

OTHER PUBLICATIONS

Patent Abstracts of Japan, Publication No. JP 08–235596 A, Sep. 13, 1996, 1 page.

*Primary Examiner*—Robert S. Tupper
*Attorney, Agent, or Firm*—Woodcock Washburn Kurtz Mackiewicz & Norris LLP

[57] ABSTRACT

A voice coil actuator return path for a linear actuator of a disk drive, which accurately and precisely positions the center guide track is disclosed. The outer return path is precisely formed from laminas of low carbon steel. The outer return path supports and accurately positions a central guide track, on which a carriage assembly slides. Moreover, the outer return path is oriented in a rectangle that is coupled to a disk drive platform, and includes an aperture through which a portion of the carriage assembly passes.

5 Claims, 5 Drawing Sheets

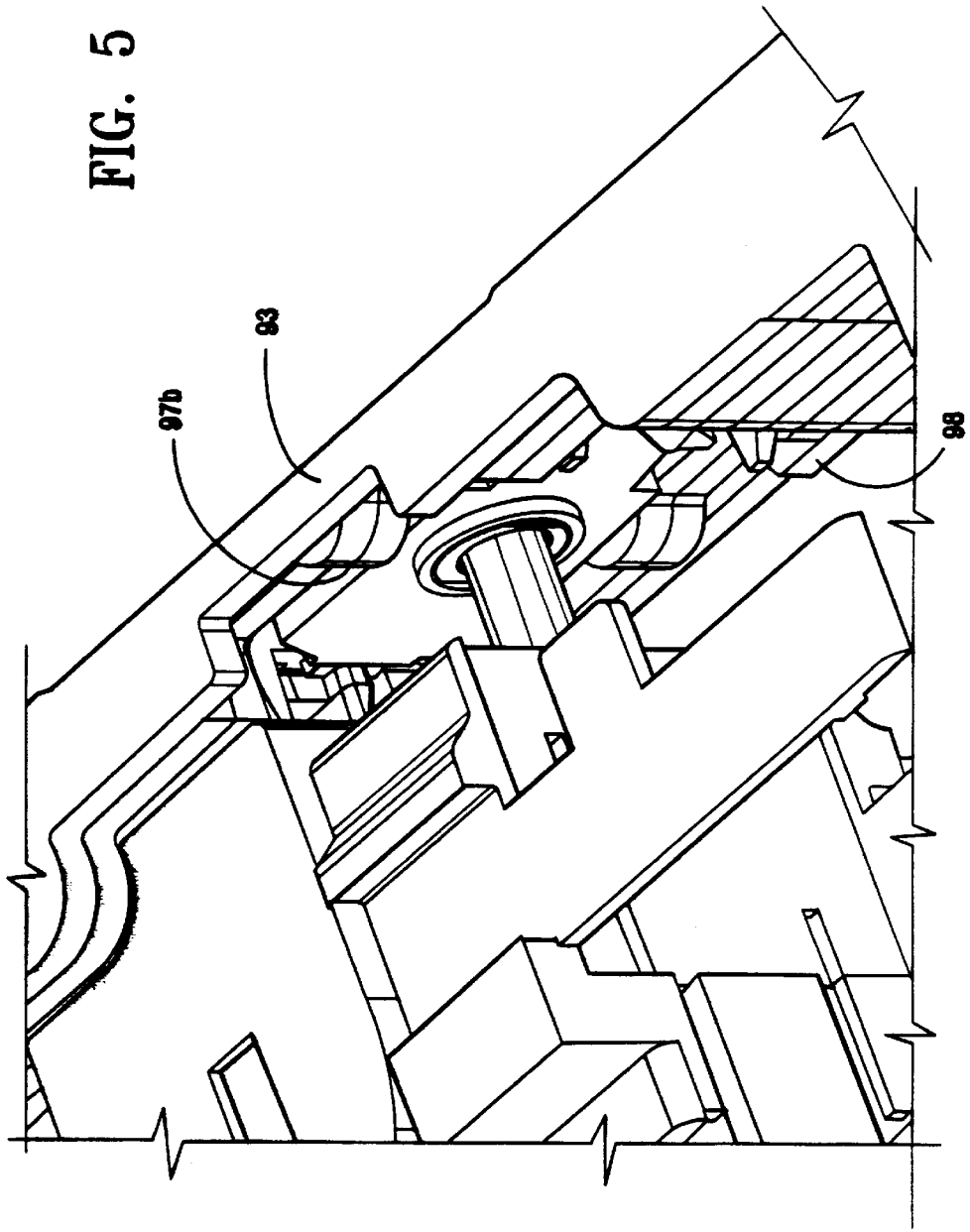

LAMINATED STEEL RETURN PATH WITH ACTUATOR SUPPORT FEATURES

This Application is a continuation of 08/881,805 filed May 30, 1997 now U.S. Pat. No. 5,943,194 issued Aug. 24, 1999 which is a continuation-in-part of U.S. Application Ser. No. 08/749,999, filed Nov. 15, 1996 now U.S. Pat. No. 5,748,410 issued May 5, 1998.

FIELD OF THE INVENTION

The present invention relates to data storage devices, or disk drives, for storing digital information, and more particularly, to an outer return path for a voice coil actuator of a disk drive.

DESCRIPTION OF THE PRIOR ART

Disk drives for storing electronic information are found in a wide variety of computer systems, including workstations, personal computers, and laptop and notebook computers. Such disk drives can be stand-alone units that are connected to a computer system by cable, or they can be internal units that occupy a slot or bay in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 mm to 15 mm. These dimensions place many constraints on the design of such a drive, and give rise to numerous design problems. The present invention addresses and overcomes one such problem.

The return path assembly for carrying the magnetic flux is traditionally comprised of two inner return path members and an outer return path that may be formed of multiple parts. Magnets are typically bonded to the inner walls on the sides of the outer return path. The inner and outer return paths form a flux return path for a magnetic field generated by the magnets. The magnetic flux within the air gap between the magnets and the inner return paths induces a force on the actuator in response to an electric current in the actuator coil. Typically, a flex circuit attached to the carriage assembly supplies current to the coil and carries signals between the heads and an interface board.

These multiple return path members typically are formed by a stamping process from a thick, magnetically permeable material, usually steel. Unfortunately, conventional stamping processes may form imprecise parts because of a large amount of die-roll-off. Because of their typical thickness of 0.25" or greater, conventional return path components that are formed by stamping are subject to such imprecision. One method of diminishing imprecision caused by die roll-off is to stamp multiple thin laminas, rather than stamping a single piece of final thickness. The thin laminas may then be stacked together to achieve the full, desired thickness. U.S. Pat. Nos. 4,619,028;; 5,087,849; and 5,123,155 entitled, respectively "Apparatus for Manufacturing Laminated Parts," "Laminated Parts and a Method of Manufacture Thereof," and "Apparatus and Method for Manufacturing Laminated Parts," (Neuenschwander), each of which is assigned to L.H. Carbide Corp., Fort Wayne Ind., and each of which is incorporated herein by reference in its entirety, describe methods of manufacture, manipulation, and assembly of laminated parts.

Often, the outer return path includes separately produced pieces, which each must be connected to a drive chassis. Typically, each of the return path pieces must be screwed into the drive chassis or screwed together. These extra attachment and production steps introduce further imprecision and add installation complexity and cost. These undesirable characteristics are exasperated by the industry trend toward smaller drive components.

Co-pending application Ser. No. 08/727,128 entitled, "Actuator For Data Storage Device" (Attorney's Docket No. IOM-9315), incorporated herein by reference in its entirety, describes a linear actuator comprising a central guide track on which bushings within the carriage assembly ride. Each of the bushings, actuator arm assemblies, and coil are spaced substantially symmetrically about the central guide track. Such symmetrical spacing is an advantage because it aligns the carriage center of mass and center of force along the central guide track. Such alignment minimizes friction and avoids binding forces and resonance problems.

To obtain these advantages, the central guide track should be accurately positioned within the actuator. Unfortunately, imprecise forming of the return path and corresponding large assembly tolerances make accurate positioning difficult. Disk drives are typically crowded in the area of the linear actuator, thus making support of the central guide track even more problematic.

There is a need, therefore, for a return path that accurately positions and supports the central guide track, that may be precisely produced, and that may be accurately and easily installed. The present invention satisfies this need.

SUMMARY OF THE INVENTION

The present invention is directed to a magnetic return path for a linear actuator of a disk drive that is formed by stacking multiple layers of laminas, each of which are stamped from a sheet of magnetically permeable material, preferably a low carbon steel. Because the stamping process produces more precise (that is, more repeatable) parts when forming thin products, individual laminas have precise and accurate dimensions. This greater precision is utilized according to the present invention in several inventive ways. In a first aspect of the present invention, an outer return path supports and accurately positions a central guide track, on which a carriage assembly slides. In another aspect of the present invention, a top and a bottom lamina bridge a front and a rear aperture formed in the outer return path, thereby connecting the two sides to produce a one-piece outer return path member. In yet another aspect of the present invention, the outer return path supports inner return path members, which are held in place by a lamina seat on a bottom lamination and by actuator magnets without fasteners. In further aspects of the present invention, numerous inventive features are included in individual or cooperating laminas, as will be described in greater detail below.

Each individual lamination may be produced with a manufacturing dimensional tolerance of ±0.001". A return path produced by stacking such laminations provides accuracy and precision in locating and supporting a center guide track. Further, the return path according to the present invention has enhanced ease of production and assembly. For example, the carriage assembly, outer return path (including magnets), and inner return path members fit together without fasteners to form a single assembly. Only approximately three screws are required to hold this integral assembly to the drive chassis.

The outer return path forms approximately a horizontal rectangle and includes a front aperture through which a portion of the carriage assembly passes. A bottom and a top outer return path lamina form a continuous, substantially rectangular shape. The top and bottom laminas are separated by several intermediate laminas. Some of the intermediate laminas are formed in two pieces—a first intermediate lamina and a second intermediate lamina. The first and second lamina substantially form a "C channel" shape and a reverse "C channel" shape, respectively. Several first intermediate laminas are stacked together and are disposed on an opposing side from several, stacked second intermediate laminas.

The gap between the first and second intermediate laminas forms the front aperture and a rear aperture. According to an aspect of the present invention, the front and rear apertures are spanned by both top and bottom lamina bridges. The entire outer magnetic return path, including the carriage assembly, forms one piece. The front aperture enables support of an insert that spans the front aperture and supports the actuator central guide track. The rear aperture similarly has an insert for supporting the rear end of the central guide track. Certain opposing intermediate laminas are formed with a cantilever member that protrudes into the front aperture near a horizontal centerline of the front aperture. A front insert, which includes a flexure support and head loading ramps, may be mounted onto the cantilever members by snapping the beam onto the cantilever members. Because the laminas may be accurately and precisely produced, the front and rear inserts may be accurately positioned.

Each of the first and second intermediate laminas also have a protruding lug that horizontally extends from the outer return path sides. Preferably, the outer return path has a thin neck in the general area of the lugs on each side to diminish the return path footprint size. The protruding lug has holes for attaching the return path to a drive base. This protruding lug enables the outer return path, as well as the center guide track and the carriage which are supported from the outer return path, to be installed to the chassis as a single, assembled piece.

Two inner return path members, which rest on a seat formed by the bottom lamina and are held in place by the magnets, span from a an outer return path front portion to a rear portion. Because the inner return paths match the shape of the outer return path where they contact, the magnets hold the inner return path in place and no additional fasteners are required.

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 5 is a view of the rear portion of the return path.

DETAILED DESCRIPTION OF THE PREFERRED EMBODIMENT

Figure 1:
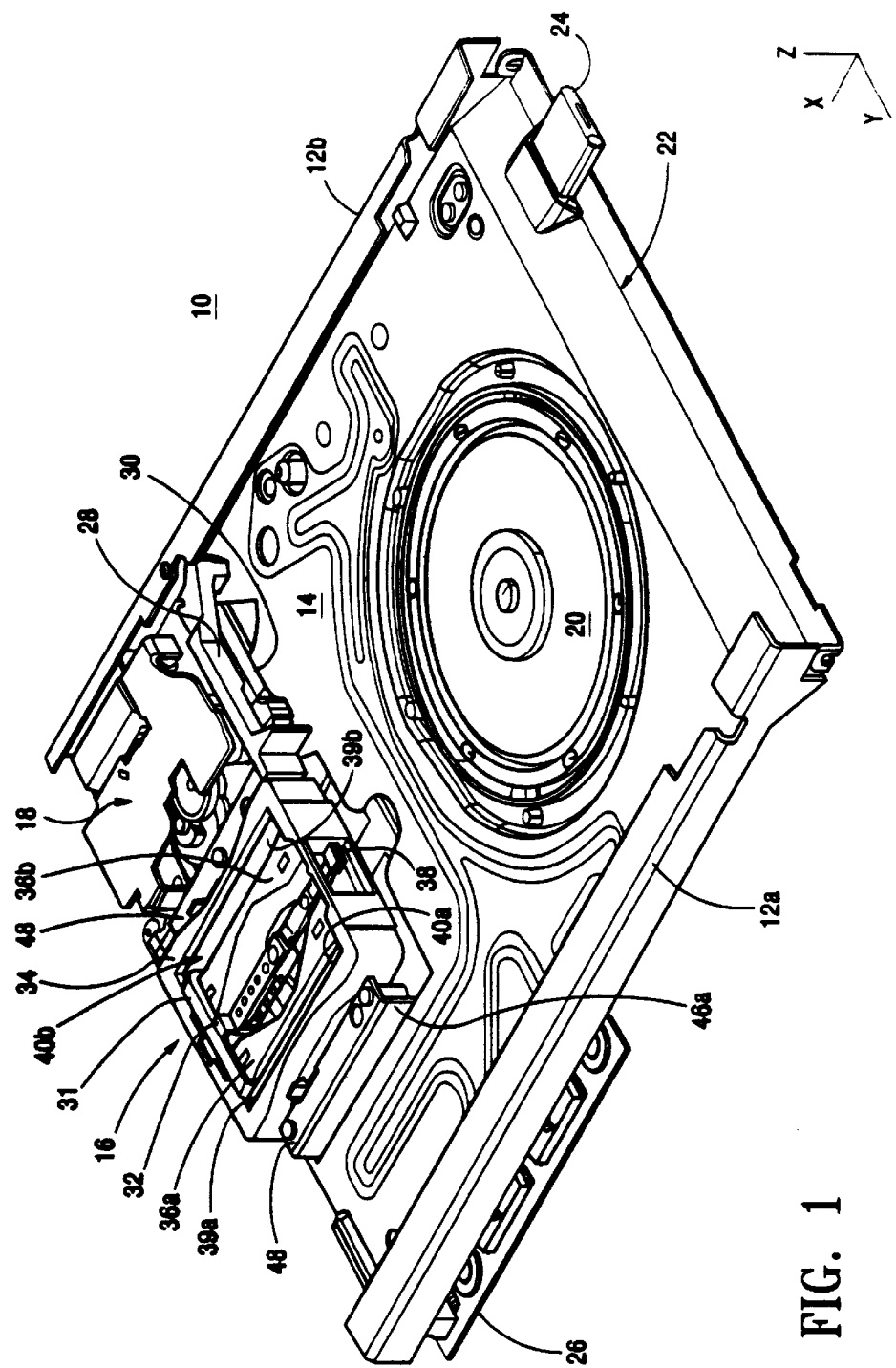
FIG. 1 shows an exemplary disk drive in which the return path of the present invention may be employed.

FIG. 1 shows an exemplary disk drive 10 in which the present invention may be employed. The disk drive 10 comprises a chassis 14 having u-shaped outer edges that form opposed guide rails 12a, 12b that guide a removable disk cartridge (not shown) into the disk drive through opening 22. In the present embodiment, the chassis is metallic. A thin metal top cover (not shown) of the disk drive 10 has been removed so that the internal components of the drive are visible.

A cartridge shutter lever 28 and an eject lever 30 are rotatably mounted on the chassis. Both levers 28 and 30 are shown in FIG. 1 in the positions that they occupy when a disk cartridge is fully inserted into the drive. During cartridge insertion, the shutter lever swings from a forward position to the position shown in FIG. 1. During this movement, an abutment surface on the shutter lever 28 engages a shutter of the disk cartridge and moves the shutter to the side, exposing a head access opening in the front peripheral edge of the cartridge. The eject lever also moves from a forward position to the position shown in FIG. 1, when the cartridge is inserted. In the position shown in FIG. 1, the eject lever is in a cocked position, under spring tension. When it is desired to eject the disk cartridge from the drive 10, an eject button 24 is pushed. Among other things, this causes the eject lever 30 to be released from its cocked position, so that it springs forward to force the disk cartridge backwardly out of the disk drive.

The disk drive 10 also has a linear actuator 16 disposed at the rear of the chassis 14. The linear actuator 16 comprises a carriage assembly 32, an outer magnet return path assembly 34, and two inner return paths 36a, 36b on opposite sides of the carriage assembly 32. After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 2:
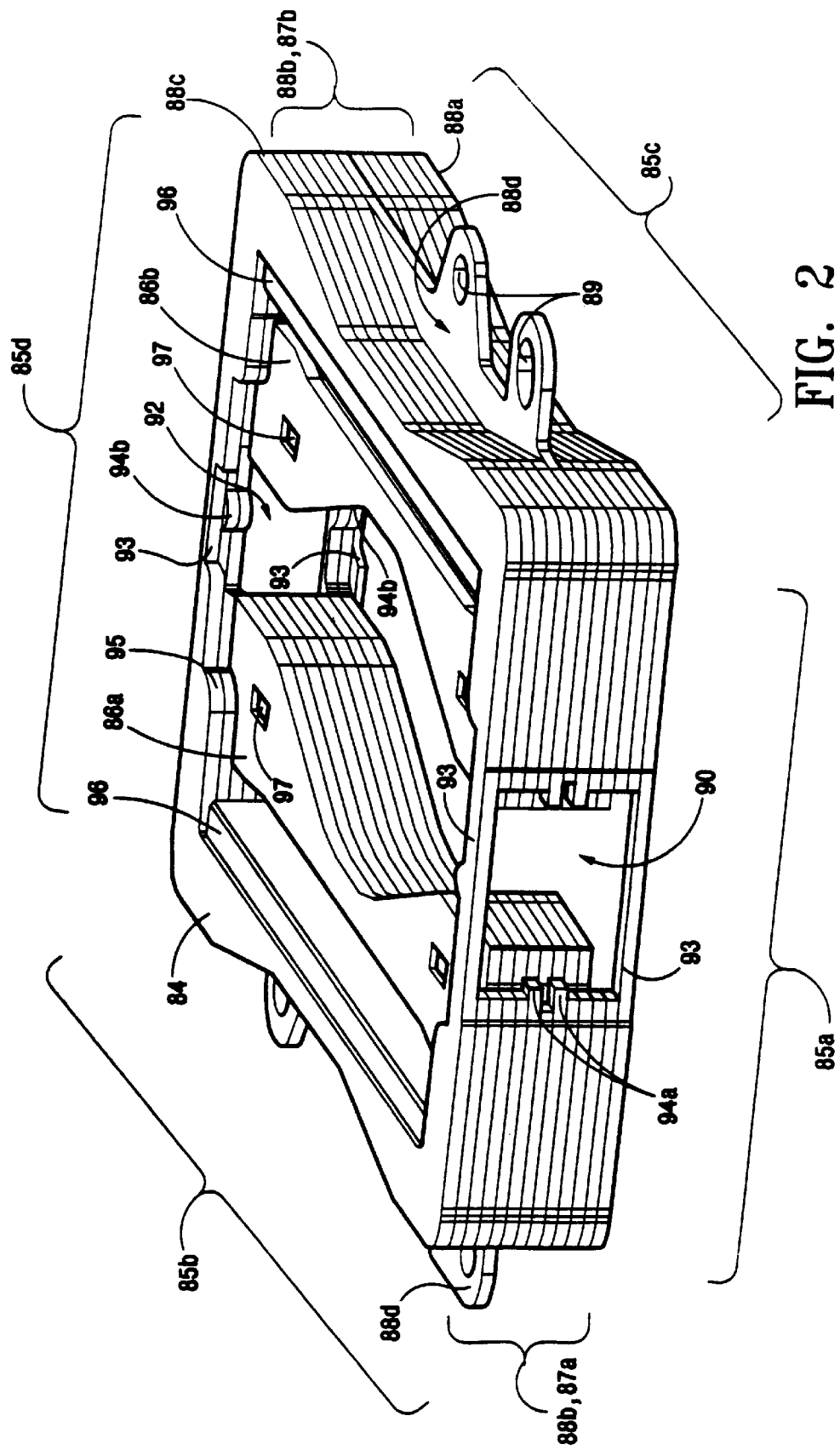
FIG. 2 shows a perspective view of the return path according to the present invention with cooperating parts removed for clarity.
Figure 3:
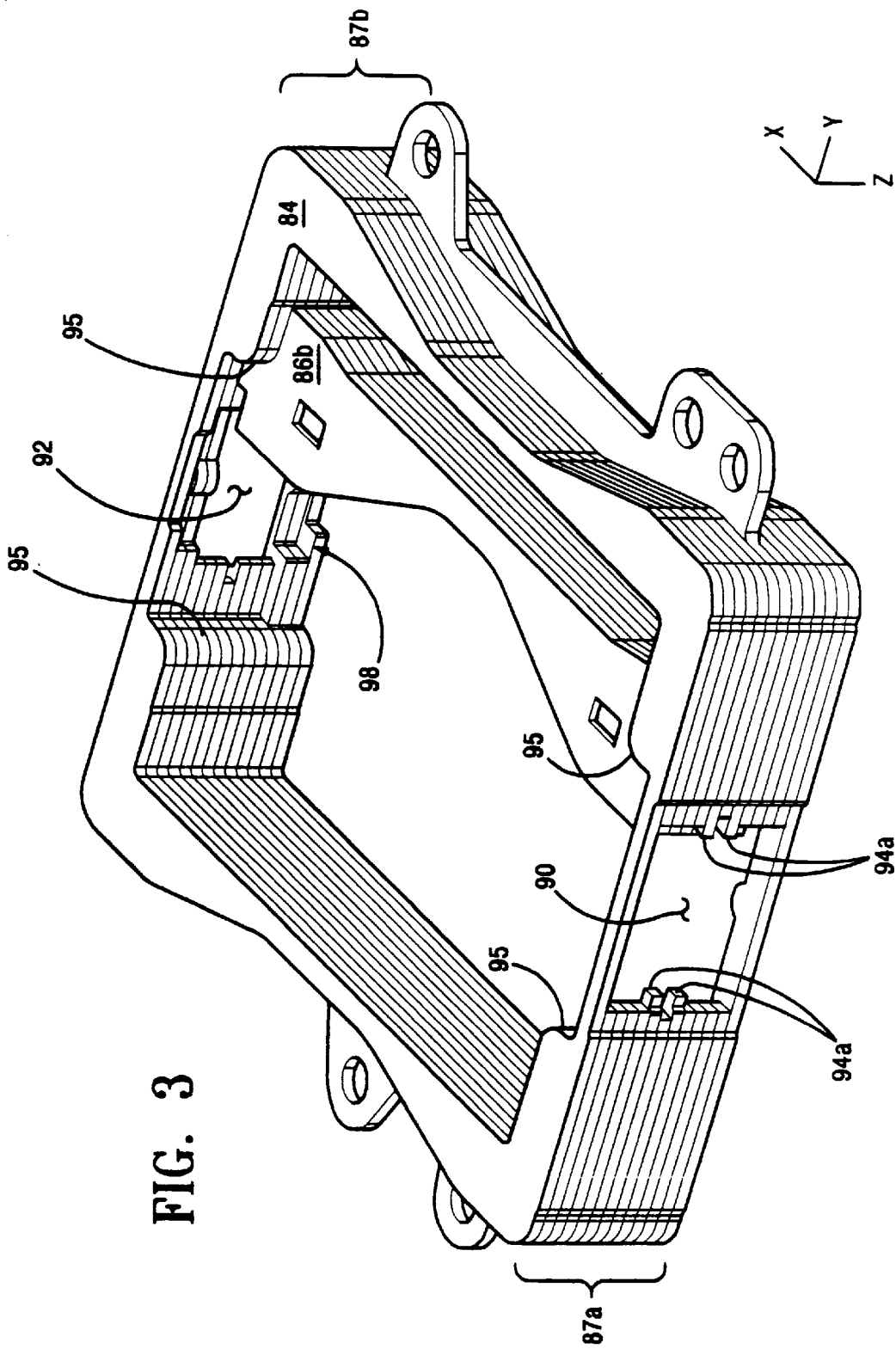
FIG. 3 shows a perspective view of the return path according to the present invention with one of the inner return path members and the actuator magnets removed for clarity.

Referring to FIG. 2 and FIG. 3, a linear actuator having a voice coil motor with a magnetic flux return path 82 is provided. Return path 82 comprises an outer return path 84, first and second inner return path members 86a and 86b, respectively, and two actuator magnets 96. Outer return path 84 has a substantially rectangular shape that, for descriptive purposes, will be referred to as comprising a front portion 85a, two side portions 85b and 85c, and a rear portion 85d, although it is understood that outer return path 84 is preferably formed in a single piece. Inner return path members 86a and 86b span between front portion 85a and rear portion 85d and are supported therefrom. A first of the two magnets 96 is disposed on the inside of side portion 85b and a second of the two magnets 96 is disposed on the inside of side portion 85c. Outer return path 84 and inner return path numbers 86a and 86b are formed by stacking several laminas of substantially flat, magnetically-permeable sheets. Preferably, outer return path 84 is formed by stacking approximately twelve sheets of low carbon steel to form a vertical dimension of approximately 6 mm. Preferably, outer return path 84 is approximately 35.5 mm long (outside dimension measured in a direction parallel to the center guide track). Inner return paths 86a,b are preferably formed of approximately ten of such laminas, as will be described more fully below.

Outer return path 84 is preferably comprised of a bottom lamination 88a, ten intermediate laminations 88c, and a top lamination 88c. Bottom lamination 88a and top lamination 88c are continuous members that form top and bottom surfaces, as well as the perimeter, of outer return path 84. Intermediate laminations 88b, which are divided into ten first intermediate lamination segments 87a and ten second intermediate lamination segments 87b, are stacked between bottom lamination 88a and top lamination 88c. First intermediate lamination segments 87a are formed in an approximate "c channel" shape (viewed from above). Second intermediate lamination segments are formed in an approximate reverse "c channel" shape (viewed from above). First intermediate segments 87a form side portion 85b and the corresponding portion of both front portion 85a and rear portion 85b (that is, portions 85a and 85b form the legs of the "c"). Second intermediate segments 87b form side portion 85c and the corresponding portion of both front portion 85a and rear portion 85d.

Figure 4:
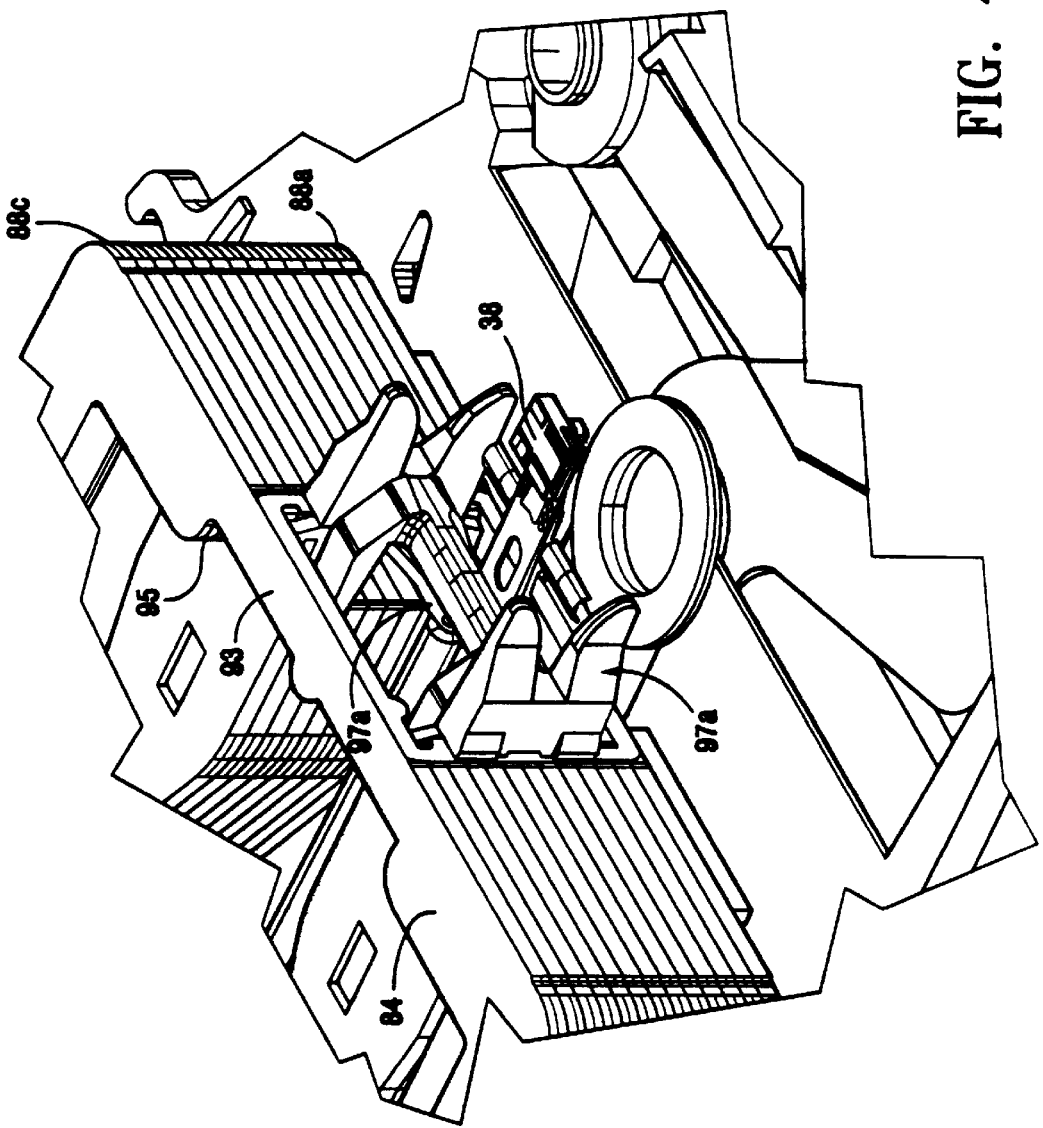
FIG. 4 is view of the carriage and front aperture of the return path.

Referring to FIG. 4 and FIG. 5, first and second intermediate lamination segments 87a and 87b, respectively, when assembled between bottom and top laminations 88a and 88c, respectively, are spaced apart to form front aperture 90 in front portion 85a and to form rear aperture 92 in rear portion 85d.

Bridges 93, which are part of bottom lamination 88a and top lamination 88c, span both above and below the front aperture 90 and the rear aperture 92. At least one, preferably two, of both first intermediate segments 87a and second intermediate segments 87b include cantilever members 94a that protrude into front aperture 90. Cantilever members 94 are preferably vertically disposed proximate a mid line of the aperture. Cantilever members 94a form protrusions onto which attach a flexure member and loading ramps 97a, shown in FIG. 4. Laminations 87a and 87b have rear bearing mount features 94b for supporting a jewel bearing assembly 97b, shown in FIG. 5, that spans rear aperture 92. Co-pending U.S. patent application Ser. No. 08/928,189, filed May 30, 1977, entitled "Head Loading, Unloading, and Protection in a Disk Drive" (Attorney Docket Number IOM-9562), which is incorporated herein by reference in its entirety, and co-pending U.S. patent application Ser. No. 08/866,168, filed May 30, 1977, entitled "Flexured Mounting System for Friction Reduction and Friction Linearization in Linear Actuator for Disk Drive" (Attorney Docket No. IOM-9514), which is incorporated herein by reference in its entirety, describe the front insert and the rear insert in more detail.

Both outer return path side portions 85b and 85c have a thin neck portion, as shown in FIGS. 2 and 3. One of the intermediate laminations 88b comprises a lug lamination 88d that protrudes from the side portions 85b, adjacent the thin neck portion. Each lug lamination 88d has one or two holes 89 for attaching return path 82 to chassis 14 (shown in FIG. 1) by conventional means, including, for example, screwing and bolting.

Inner return path members 86a and 86b span from rear portion 85d to front portion 85a. First inner return path 86a is substantially coupled across first intermediate lamination segments 87a and second inner return path member 86b is substantially coupled across second intermediate lamination segments 87b. Intermediate lamination segments 87a and 87b have a concave surface 95 that mates to a corresponding convex surface on first and second intermediate lamination segments 87a and 87b. Each inner return path member 86a and 86b is outwardly attracted to the corresponding magnet 96 and thereby held in place. Further, bottom lamination 88a has a protrusion that forms a lamina seat 98, as shown in FIGS. 3 and 5. Lamina seat 98 protrudes from front portion 85a and rear portion 85d to support the inner return path members 86a and 86d.

The return path laminations 88a, 88b, 88c, and 88d each have multiple bosses (not shown) formed therein. The underside of each boss which are formed during stamping, form a cavity 97. When the laminations are stacked together to form an assembled return path 82, the bosses fit into the cavities 97 of the connecting lamination. Because each boss fits into the corresponding cavity 97 in a press fit, the laminations are thereby held together.

As the foregoing illustrates, the present invention is directed to a return path that accurately and precisely positions the center guide track and permits assembly of the return path and associated components in one piece. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A return path for accurately positioning a center guide track, said return path comprising an outer return path and an inner return path coupled to opposing sides of said outer return path, each one of said outer return path and said inner return path formed from a plurality of laminas stacked together, said outer return path including a front portion having a front aperture formed therein and a rear portion having a rear aperture formed therein, said outer return path including at least one bottom lamina, at least one top lamina, and a plurality of intermediate laminas disposed between the at least one top lamina and the at least one bottom lamina and coupled theretogether, each one of said at least one bottom lamina and said at least one top lamina forming a bridge across the front aperture and another bridge across the rear aperture, said plural intermediate laminas including a plurality of first intermediate laminas and a plurality of second intermediate laminas, said plural first laminas mutually stacked together, said plural second laminas mutually stacked together, a front end of the stacked first intermediate laminas being spaced apart from a front end of the stacked second intermediate laminas to form said front aperture, a rear end of the stacked first intermediate laminas being spaced apart from a front end of the stacked second intermediate laminas to form said rear aperture, at least one of the stacked first intermediate laminas and at least one of the stacked second intermediate laminas including a cantilever member protruding therefrom into the front aperture, said at least one cantilever member being capable of supporting a member holding a center guide track, whereby forming the outer return path by stacking laminas enables precise manufacture of the outer return path.

2. The return path of claim 1 wherein the outer return path includes a protruding lug capable of attaching the outer return path to a drive base.

3. The return path of claim 2 wherein the protruding lug is formed from an intermediate portion of the outer return path.

4. The return path of claim 1 wherein the outer return path is approximately 35.5 mm long.

5. The return path of claim 1 wherein the outer return path is approximately 6 mm high.

\* \* \* \* \*